United States Patent [19]

Barnes

[11] Patent Number: 5,694,134
[45] Date of Patent: Dec. 2, 1997

[54] PHASED ARRAY ANTENNA SYSTEM INCLUDING A COPLANAR WAVEGUIDE FEED ARRANGEMENT

[75] Inventor: Frank Barnes, Boulder, Colo.

[73] Assignee: Superconducting Core Technologies, Inc., Golden, Colo.

[21] Appl. No.: 182,296

[22] Filed: Jan. 14, 1994

Related U.S. Application Data

[63] Continuation-in-part of Ser. No. 983,632, Dec. 1, 1992, Pat. No. 5,472,935, and a continuation-in-part of Ser. No. 140,770, Oct. 21, 1993.

[51] Int. Cl.$^6$ .......................... H01Q 1/38; H01Q 13/08; H01P 1/18
[52] U.S. Cl. .......................... 343/700; 333/161
[58] Field of Search .................. 333/161; 343/700 MS; H01Q 1/38, 13/08, 21/10, 21/12

[56] References Cited

U.S. PATENT DOCUMENTS

| | | | |
|---|---|---|---|
| 5,358,926 | 10/1994 | Olson et al. ......................... | 505/210 |
| 5,472,935 | 12/1995 | Yandrofski et al. .................. | 333/995 X |

FOREIGN PATENT DOCUMENTS

| | | | |
|---|---|---|---|
| 5029809 | 2/1993 | Japan ........................... | 333/238 |
| 1177869 | 9/1985 | U.S.S.R. ........................ | 333/161 |
| 1224868 | 4/1986 | U.S.S.R. ........................ | 333/161 |

OTHER PUBLICATIONS

Varandan, V.K. et al; "Ceramic Phase Shifters for Electronically Steerable Antenna Systems"; Microwave Journal; Jan. 1992; pp 16,119, 121, 122, 125, 126.
Das, S.N.; "Ferroelectrics for Time Delay Steering of an Array"; Ferroelectrics; vol 5, 1973; pp 253–257.

*Primary Examiner*—Benny T. Lee
*Attorney, Agent, or Firm*—Sheridan Ross P.C.

[57] ABSTRACT

The disclosure relates to a phased array antenna for microwave and millimeter wave applications, using either microstrip line, coplanar waveguide, or other construction techniques incorporating a solid dielectric transmission line. A continuously variable phase delay structure which is used to control the beam pattern of the phased array antenna can be applied to the construction of resonant frequency tunable coplanar waveguide antennas and impedance tunable quarter-wave transformers. A thin film of barium strontium titanate ($Ba_xSr_{1-x}TiO_3$) or other nonlinear material such as $PbZr_xTi_{1-x}O_3$ (PZT), $LiNbO_3$, etc. is deposited upon the coplanar waveguide, and/or the patch antenna element. The dielectric constant of the thin film can be made to vary significantly by applying a DC voltage to the thin film. The propagation constant of a transmission line is directly proportional to the square root of the effective dielectric constant (assuming a lossless dielectric). In an array of multiple antenna elements provided with the feed structure using the disclosed transmission lines, the direction of the resultant main beam of the array can be made to vary over a complete half-sphere with only two adjustable DC voltages applied to the dielectric thin films.

4 Claims, 7 Drawing Sheets

PHASED ARRAY ANTENNA SYSTEM INCLUDING A COPLANAR WAVEGUIDE FEED ARRANGEMENT

This application is a continuation-in-part application of U.S. application Ser. No. 07/983,632, filed on Dec. 1, 1992 for "Tunable Microwave Devices Incorporating High Temperature Superconducting and Ferroelectric Films", now U.S. Pat. No. 5,472,935, issued Dec. 5, 1995, and of U.S. application Ser. No. 08/140,770, filed on Oct. 21, 1993, for "Tunable Dielectric Constant Device".

BACKGROUND OF THE INVENTION

1. Field of the Invention

This invention relates to phased array antenna systems formed from printed circuit board construction or integrated circuit techniques, incorporating continuously-variable phase delay transmission lines which provide a method for steering the antenna beam, and a method for increasing the bandwidth of such antenna systems when using coplanar waveguide radiating elements.

2. Description of the Prior Art

Previous designs for phased array antennas at microwave or millimeter wave frequencies have proven overly complex and expensive. Although many different designs exist, most are confronted by a common problem: the antennas use elements (either passive or active) which produce a fixed amount of phase shift, and which must be independently switched into or out of the antenna feed structure. Such designs invariably require a complex feeding structure and control network, which can significantly increase the cost, complexity, weight, and size of the entire antenna system. Examples of such previous designs are shown in:

U.S. Pat. No. 4,063,246; Greiser, John W., "Coplanar Stripline Antenna";

U.S. Pat. No. 3,921,177; Munson, Robert E., "Microstrip Antenna Structures and Arrays";

U.S. Pat. No. 5,144,320; Stern, et al., "Switchable Scan Antenna Array";

U.S. Pat. No. 4,839,659; Stern, et al., "Microstrip Phase Scan Antenna Array";

U.S. Pat. No. 4,649,393; Rittenbach, Otto E., "Phased Array Antennas with Binary Phase Shifters";

U.S. Pat. No. 4,521,781; Campi, et al., "Phase Scanned Microstrip Array Antenna"; and U.S. Pat. No. 3,806,930; Gobert, Jean F., "Method and Apparatus for Electronically Controlling the Pattern of a Phased Array Antenna".

Other designs have been proposed which use tunable ferrite material imbedded in or mounted on the dielectric substrate of the feed lines, but these designs have not been extensively adopted. These designs are shown in:

U.S. Pat. No. 4,458,218; Babbitt, et al., "Dielectric Waveguide Reciprocal Ferrite Shifter", U.S. Pat. No. 3,811,128; Munson, Robert E., "Electrically Scanned Microstrip Antenna".

Additionally, phased array antenna systems using microstrip patch radiators or coplanar waveguide radiating elements suffer from the bandwidth limitation of the antenna elements. Numerous methods for increasing the bandwidth of such radiators have been proposed, but all of these designs reduce the efficiency of the antenna element by either increasing the reflection coefficient at resonance, or adding a resistive network that dissipates a fraction of the applied power. These designs also increase the space requirement of the radiating element over a simple patch radiator, hence making them undesirable for use in phased array antenna systems where size and efficiency are critical design parameter.

SUMMARY OF THE INVENTION

This invention provides for a simple, low cost, phased array antenna for microwave and millimeter wave applications, using either microstrip line, coplanar waveguide, or any other construction technique incorporating a solid dielectric transmission line. Furthermore, the same continuously—variable phase delay structure used to control the beam pattern of the array can be applied to the construction of resonant frequency tunable coplanar waveguide antennas and impedance tunable quarter-wave transformers. This approach significantly increases the usable bandwidth of the radiator with no associated reduction in radiation efficiency.

According to this invention, a thin film of barium strontium titanate ($Ba_xSr_{1-x}TiO_3$) or other nonlinear material such as $PbZr_xTi_{1-x}O_3$ (PZT), $LiNbO_3$, etc. is deposited upon the coplanar waveguide, and/or the patch antenna element. The values of "x" in "$Ba_x$" and of "1–x" in "$Sr_{1-x}$" are expressions of the ratio of the proportions of barium titanate material and strontium titanate material in the barium strontium titanate material of the thin film. The value of "x" in $Pb_x$ and of "1–x" in $Zr_{1-x}$ are expressions of the ratio of the proportions of lead titanate material and lead zirconate material in the lead zirconium titanate material of the thin film. If the thin film is properly fabricated, its dielectric constant can be made to vary significantly by applying a DC voltage to the film. The propagation constant of a transmission line is directly proportional to the square root of the effective dielectric constant (assuming a lossless dielectric). Accordingly, the phase delay through a fixed length of a transmission line will vary as the square root of the effective dielectric constant of the line. Experimental results show that a DC electric field ranging from 0 kV/cm to 50 kV/cm can change the dielectric constant of a 3000 Å thick $Ba_{0.008}Sr_{0.92}TiO_3$ thin film from $260\epsilon_0$ to $200\epsilon_0$ at the temperature of 77K, for use with a superconducting embodiment of this invention where $\epsilon_0$ is the permittivity of free space, i.e. $8.854 \times 10^{-12}$ farad/meter. Thus the increase in the electric field applied to the nonlinear dielectric material reduces the value of the dielectric constant of the nonlinear dielectric material. Similar results can be obtained at room temperature by increasing the barium content of the film.

If deposited upon a coplanar waveguide, the dielectric constant of the thin film is so high that most of the electromagnetic energy transmitted through the line is contained within the film. Hence, the dielectric substrate under the film has relatively little effect on the effective dielectric constant of the transmission line. However, the choice of a substrate that is lattice matched to $Ba_xSr_{1-x}TiO_3$ improves the quality of the thin film.

If a fixed length of such a transmission line is used to feed an antenna element, the phase of the signal applied to the antenna can be varied continuously by varying the DC voltage applied to the dielectric film. Similarly, if a coplanar waveguide antenna is designed with a $Ba_xSr_{1-x}TiO_3$ thin film deposited thereon, a DC field applied between the radiating element and the surrounding ground plane will allow one to vary the resonant frequency of the antenna. Additionally, if a $Ba_xSr_{1-x}TiO_3$ thin film is deposited upon a coplanar-waveguide quarter-wave transformer, its impedance becomes tunable with the applied DC field.

If an array of multiple antenna elements is designed with the feeding structure using the transmission lines described herein, the direction of the resultant main beam of the array can be made to vary over a complete half sphere with only two adjustable DC voltages. Additionally, a third independent DC voltage can be used for the impedance tuning of the matching network or the resonant-frequency tuning of the radiating elements to significantly increase the usable bandwidth of the array.

DESCRIPTION OF PREFERRED EMBODIMENTS

Figure 1:
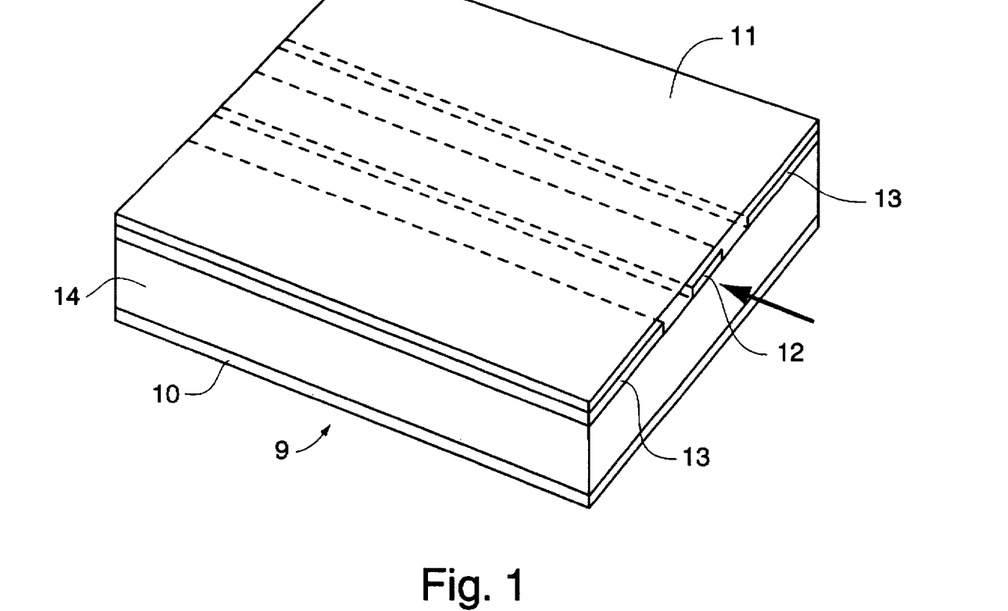
FIG. 1 shows the configuration of a coplanar waveguide with an additional lower ground plane and a $Ba_xSr_{1-x}TiO_3$ thin film overlay whose dielectric constant can be tuned by the applied DC field.

FIG. 1 illustrates a coplanar waveguide (9) with an additional lower ground plane (10). A $Ba_xSr_{1-x}TiO_3$ thin film (11) whose dielectric constant is high and can be varied by an applied DC field is deposited on the coplanar waveguide. There are several methods such as electron beam evaporation, sputtering, or laser beam ablation for depositing the $Ba_xSr_{1-x}TiO_3$ thin film. These processes are well-known by those skilled in the art. Note that depositing a $Ba_xSr_{1-x}TiO_3$ thin film between the center conductor (12) and the upper ground planes (13) of the coplanar waveguide is another option, but will complicate the fabrication process. If a dielectric substrate (14) is chosen that is lattice-matched to the $Ba_xSr_{1-x}TiO_3$ thin film (11), the structural integrity of the circuit will be significantly enhanced. It is to be noted that other nonlinear material such as $PbZr_xTi_{1-x}O_3$ (PZT),$LiNbO_3$ could also be used. It is implied that the materials could be substituted for $Ba_xSr_{1-x}TiO_3$ whenever it is mentioned in the following description and claims.

Figure 1A:
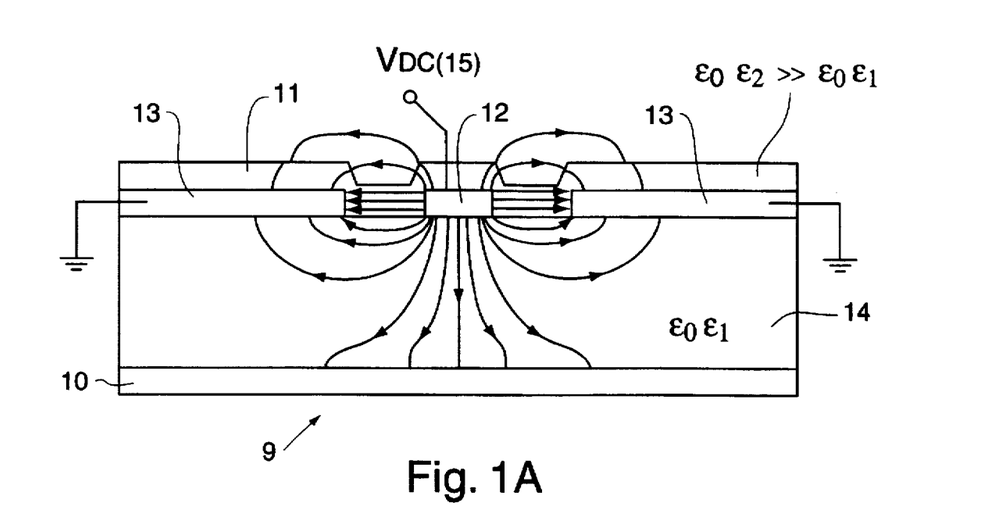
FIG. 1A is a vertical section of FIG. 1 showing electric lines of force through the coplanar waveguide of FIG. 1.

Since the dielectric constant of $Ba_xSr_{1-x}TiO_3$ is very high, the effective dielectric constant of the coplanar waveguide is strongly dependent on the dielectric constant of the thin film (11), and to a lesser extent, the substrate material (14). FIG. 1A shows the electric lines of force through a cross section of the coplanar waveguide (9). A variable DC voltage $V_{dc}$ (15) applied between the center conductor (12) and the upper ground plane (13) of the coplanar waveguide (9) will induce a change in the dielectric constant of the $Ba_xSr_{1-x}TiO_3$ thin film (11), which changes the effective dielectric constant of the coplanar waveguide (9). As a result, the coplanar transmission line exhibits a variable phase delay. In other words, the electrical length of the transmission line can be changed by varying the applied DC voltage.

Although not shown in this or the subsequent drawings, the DC voltage source must be kept isolated from the RF energy in the circuit. Isolation can be accomplished by a variety of RF blocking techniques well known to those skilled in the field.

Figure 2:
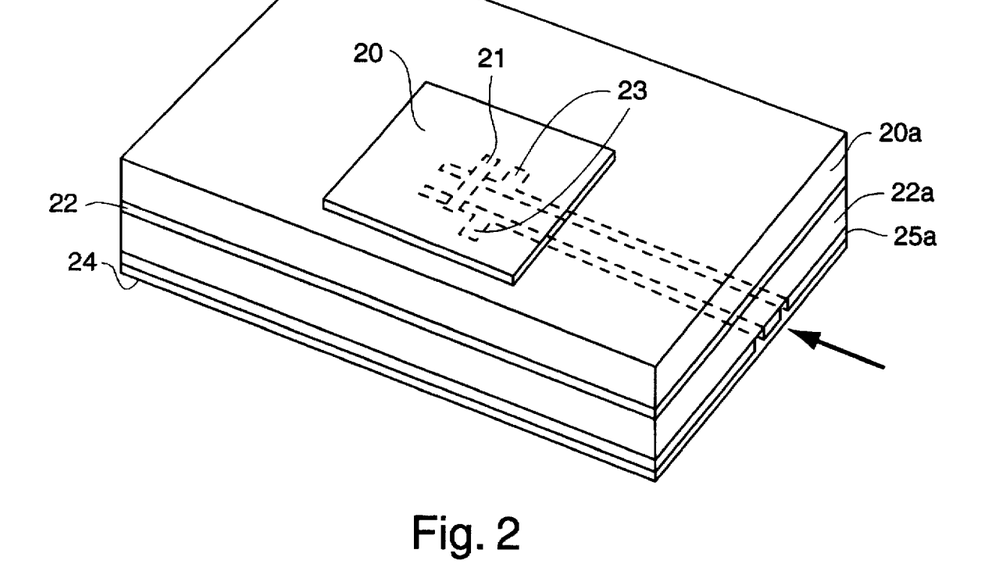
FIG. 2 illustrates the aperture-coupled feeding of a microstrip patch antenna by the coplanar waveguide feed shown in FIG. 1.
Figure 2A:
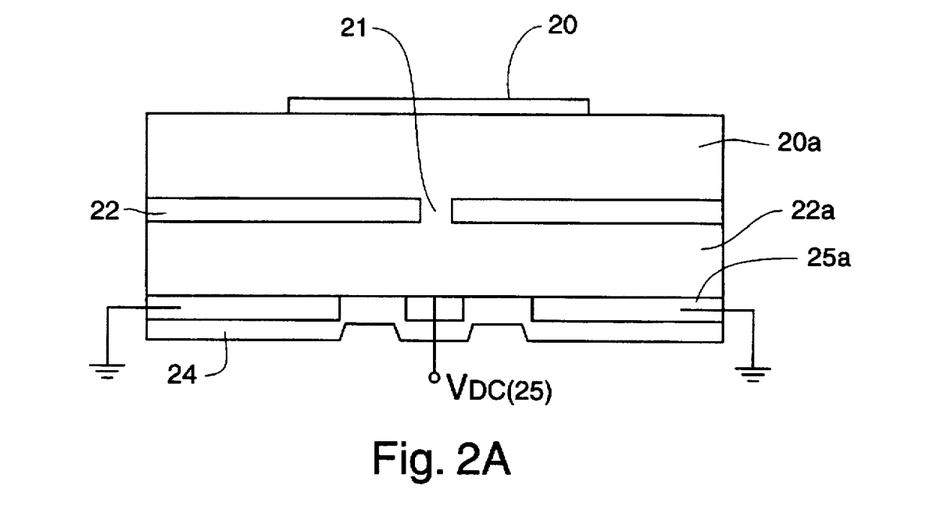
FIG 2A is a vertical section of FIG. 2 showing the application of a variable DC bias to the coplanar feed line of FIG. 2.

FIG. 2 and 2A show the aperture-coupled feeding of a microstrip patch antenna (20) by the coplanar waveguide (9) feeding structure shown in FIG. 1. As best seen in FIG. 2A, the microstrip patch antenna (20) and the coplanar waveguide feed network (25a) are on separate substrates (20a) and (22a), respectively. Microwave power is coupled from the coplanar-waveguide feed line to the antenna patch via an aperture (21) in the common ground plane(22) joining the two substrates. As best seen in FIG. 2, the notches (23) cut out from the ground plane of the coplanar waveguide (9) act as discontinuities to scatter the input microwave signal and thus improve the coupling efficiency. The concept of using such coupling scheme is well known to those skilled in the art. Because of the $Ba_xSr_{1-x}TiO_3$ thin film overlay (24) on the coplanar-waveguide feed line (25a), the phase of the transmitted microwave signal can be tuned by applying a variable DC bias $V_{dc}$ (25) to the coplanar feed line, as shown in FIG. 2A.

Figure 3:
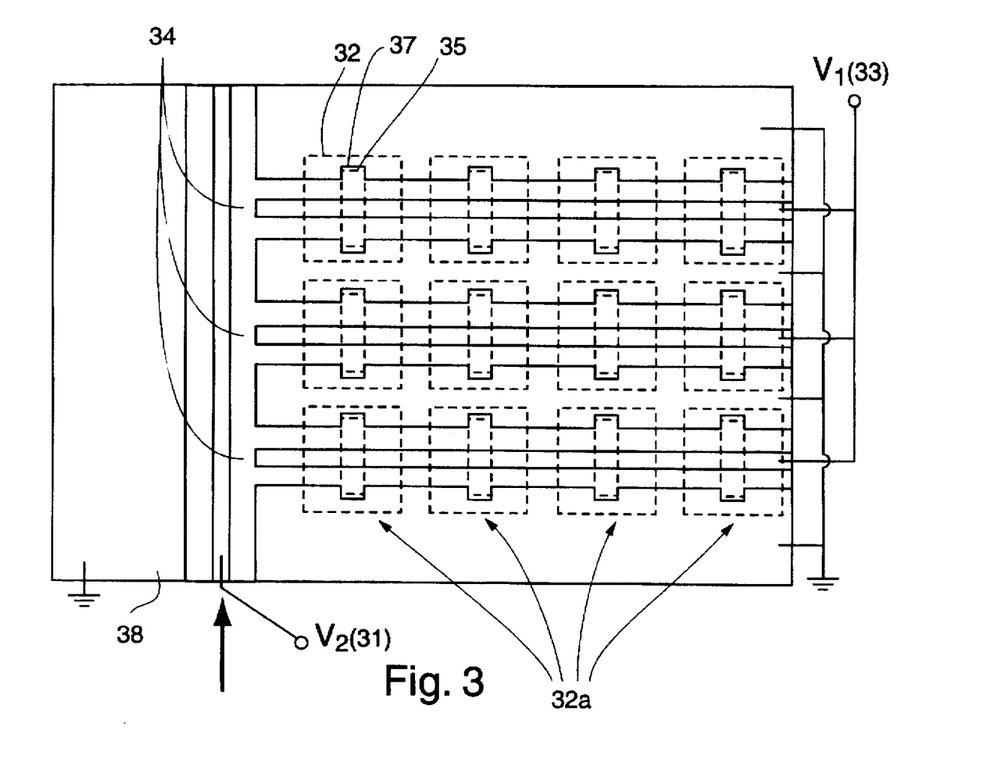
FIG. 3 shows a two-dimensional, phase-scanned microstrip antenna array series fed by the phase-tunable feeding system shown in FIG. 2. Two control voltages $V_1$ and $V_2$ are applied to provide the desired phase for each radiating element so that full half-sphere scanning is achieved.
Figure 3A:
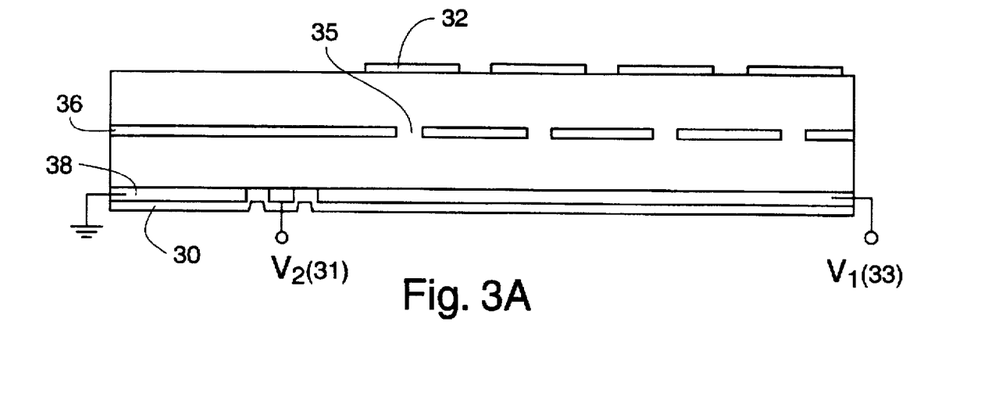
FIG 3A is a vertical section of FIG. 3 showing the application of a DC voltage to control the phase delay between the antenna elements in each row.

FIG. 3 and 3A illustrate a phased-scanned microstrip antenna array which produces a pencil beam that is steerable over an entire half-sphere, using only two control DC voltages. This design is a logical extension of FIG. 2, using the same feeding arrangement for each of the microstrip patch antenna elements. A $Ba_xSr_{1-x}TiO_3$ thin film (30) is deposited upon the coplanar feeding network (38), as shown in FIG. 3A. A DC voltage $V_2$(31) controls the phase delay between the rows (32a) of radiating elements (32) as seen in FIG. 3, while voltage $V_1$ (33) controls the phase delay between antenna elements (32) in each row. Microwave energy is capacitively coupled from the input feed line to each feed row via a gap (34), as shown in FIG. 3, which isolates the DC voltages $V_1$ and $V_2$. The widths of these gaps (34) can be adjusted so as to provide equal power to each row (32a). As shown in FIG. 3A, microwave energy is coupled to each radiating element (32) through an aperture (35) in the common ground plane (36). The lengths and widths of the apertures (35) and/or the notches (37), as shown in FIG. 3 can be adjusted so that equal power is coupled to each patch antenna element (32) in a row. The physical spacings between each radiating element (32) are designed in such a way that at zero bias the phase delay between each element (32) is an integral multiple of $2\pi$.

Figure 4:
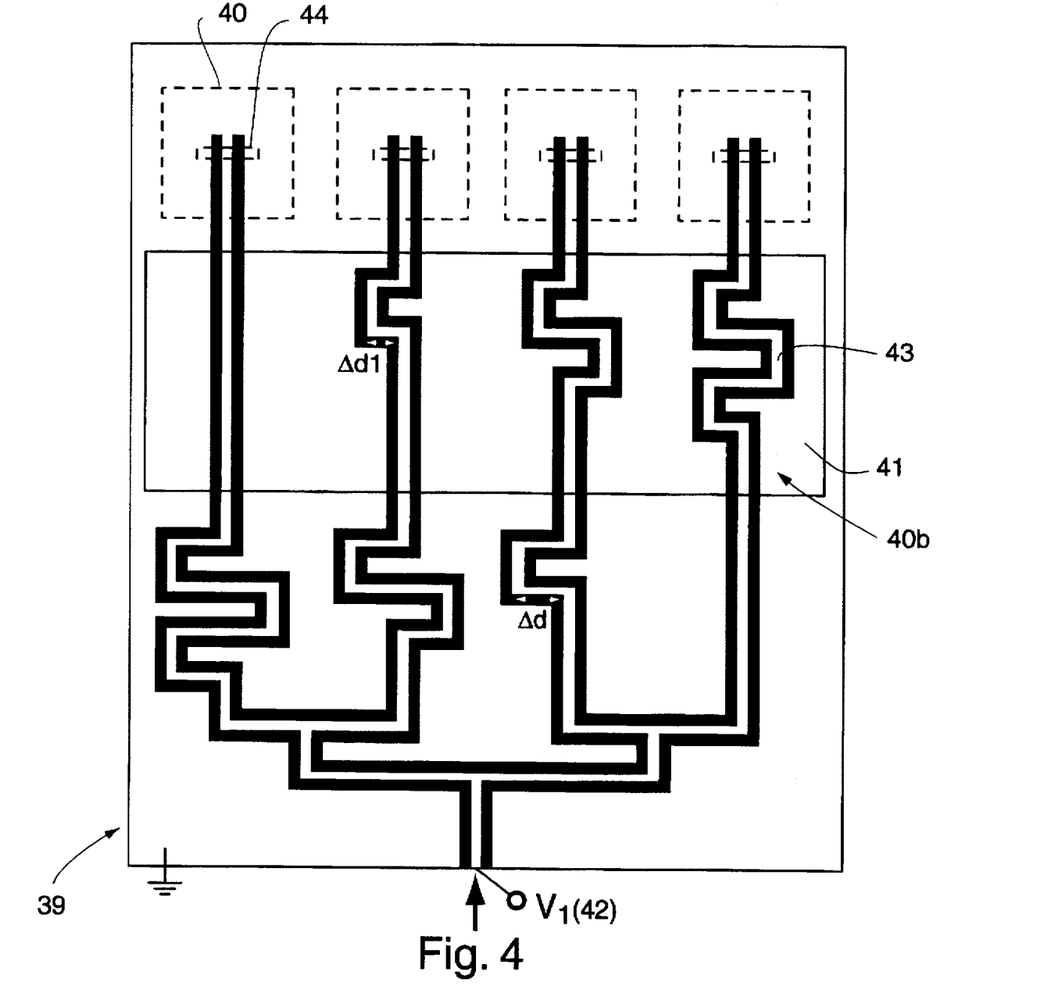
FIG. 4 demonstrates one dimension of another two-dimensional phase-scanned microstrip antenna array fed by the phase-tunable feeding system show in FIG. 2. The feed-line length for each radiating element is properly chosen so that the desired phase for each element can be tuned simultaneously with only one bias voltage $V_1$.
Figure 4A:
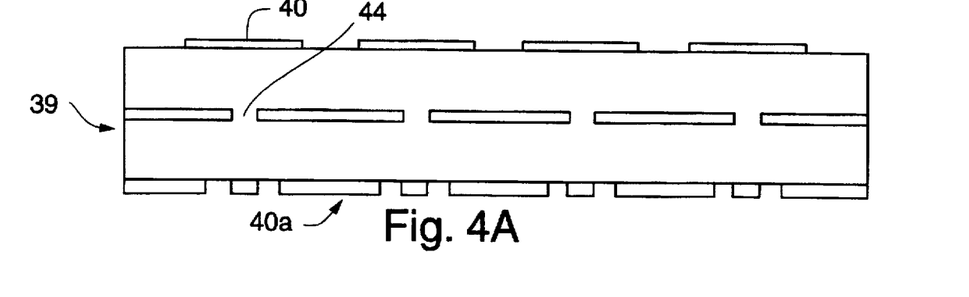
FIG. 4A is a vertical section of FIG. 4 showing the radiating elements each fed by a coplanar feed line with a variable DC bias.

FIG. 4 and 4A illustrate one-dimension of another two-dimensional, phase-scanned microstrip antenna array design (39). The radiating elements (40) are fed, by the phase-tunable feed system (40a) of the type shown in "FIGS. 4 and 4A". In other words, each individual array element is excited by a coplanar feed line (40a). As shown in FIG. 4, a $Ba_xSr_{1-x}TiO_3$ thin film (41) is deposited only on certain ones (40b) of the coplanar feed lines (40a), and its dielectric constant can be tuned by the control DC voltage $V_1$ (42). The physical length of each feed line area must be properly designed so that at zero bias the electric length (i.e., $\sqrt{\epsilon_{eff}} \cdot d$, the square root of effective dielectric constant $\epsilon_{eff}$ times the physical length (d), and thus the phase delay of each feed line (40a) is the same. We have achieved this goal by using the meander line sections (43) shown in FIG. 4, and making $\sqrt{\epsilon_{eff1}} \cdot \Delta d_1 = \sqrt{\epsilon_{eff2}} \cdot \Delta d_2$, where $\Delta d_1$ and $\Delta d_2$ are defined in FIG. 4, $\epsilon_{eff1}$ and $\epsilon_{eff2}$ are the effective dielectric constants of the coplanar wave guide with and without $Ba_xSr_{1-x}TiO_3$ film, respectively. Note that although there is shown in FIG. 4 only a one-dimensional antenna array (39), the same concept mentioned here can be easily expanded to design a two-dimensional phased array antenna.

Figure 5:
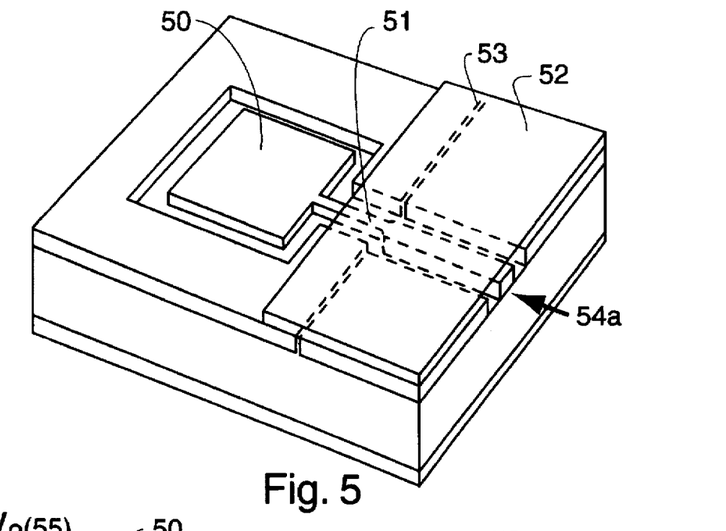
FIG. 5 shows the configuration of a coplanar waveguide antenna fed by coplanar waveguide feed line. A $Ba_xSr_{1-x}TiO_3$ thin film is deposited on top of the feed line to provide a good impedance match.
Figure 5A:
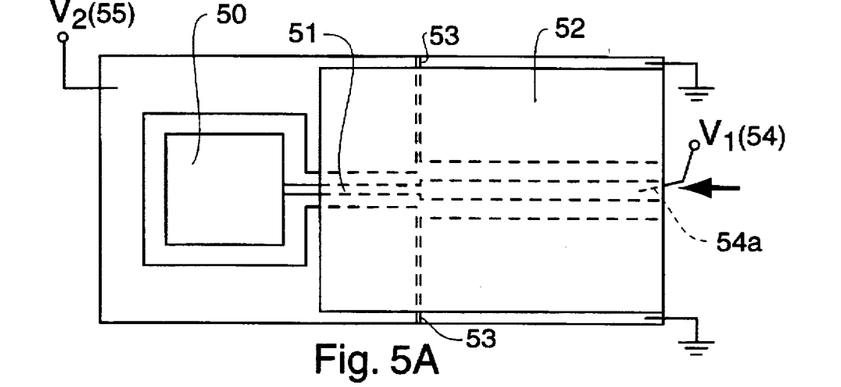
FIG. 5A is a plan view of the coplanar waveguide antenna fed by a coplanar waveguide feed as shown in FIG. 5.
Figure 5B:
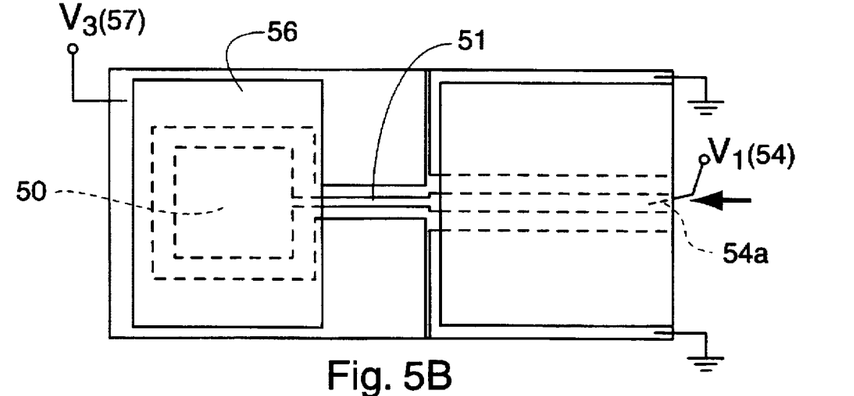
FIG. 5B is a plan view of the coplanar waveguide antenna of FIG. 5A with a thin film of $Ba_xSr_{1-x}TiO_3$ deposited on the coplanar waveguide antenna.

FIG. 5 and 5A show the configuration of a coplanar waveguide antenna (50) fed by co-planar waveguide feed line (54a). The quarter wave transformers (51) inserted between the antenna and the feed line acts as an impedance matching network. A $Ba_xSr_{1-x}TiO_3$ (52) thin film is deposited on upon the feed line (54a) and the quarter wave transformer. The gaps (53) cut out from the ground plane of the coplanar feed line are used to isolate the control DC voltages $V_1$(54) and $V_2$(55) as shown in FIG. 5A. This allows the phase delay of the feed line and the impedance of the quarter wave transformer to be tuned separately by the DC voltages $V_1$ and $V_2$, respectively. Because of the improvement of the impedance match between the radiator (50) and the feed line (54a) using impedance-tunable quarter-wave transformer, the bandwidth of the antenna (50) can be increased. Alternatively, we may increase the bandwidth by varying the resonant frequency of the antenna. This can be obtained by depositing a $Ba_xSr_{1-x}TiO_3$ thin film (56) upon the coplanar waveguide antenna, as shown in FIG. 5B. Applying a DC voltage $V_3$(57) changes the electric length of the radiator (50), and hence varies the resonant frequency of the antenna; however, because of the high dielectric-constant feature of $Ba_xSr_{1-x}TiO_3$ film, this approach may suffer from reducing the radiation power of the antenna. Note that the feeding technique for the coplanar waveguide antenna is not limited to a coplanar-waveguide feed (54a) on the same substrate as the antenna (FIG. 5), other types of feeding methods such as aperture coupling and proximity coupling can also be used.

Figure 6:
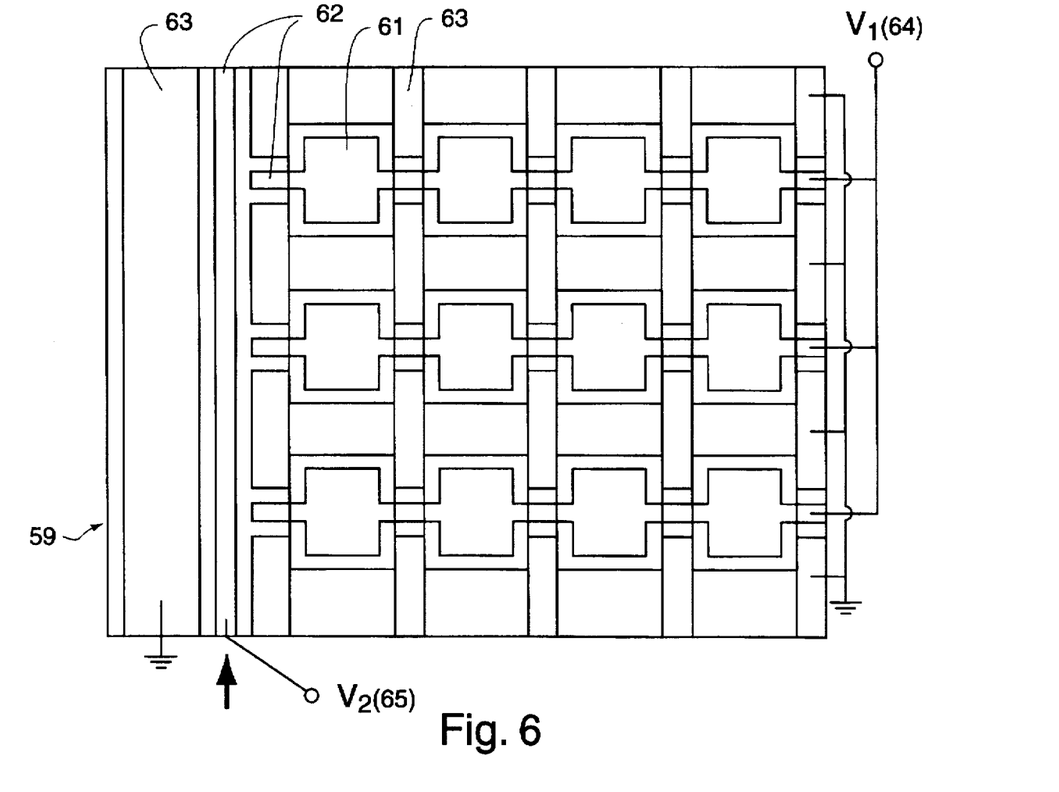
FIG. 6 shows a phase-scanned, coplanar-waveguide antenna array based on the array structure shown in FIG. 3 and the radiating elements shown in FIG. 5.
Figure 6A:
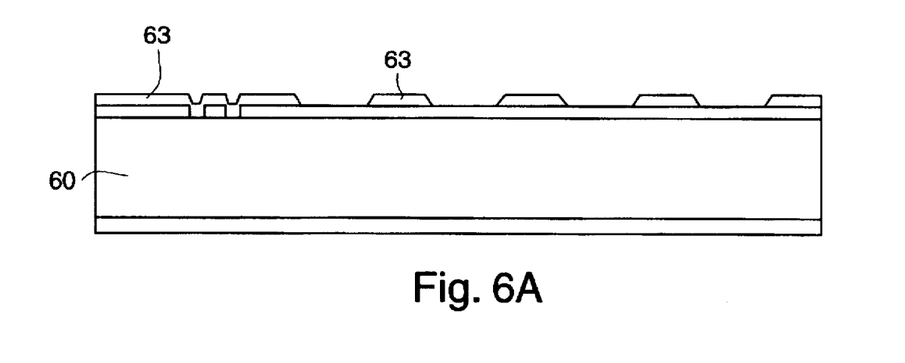
FIG. 6A is a vertical section of the coplanar-waveguide antenna array of FIG. 6 showing the feed network and the radiating elements on a single substrate.

FIG. 6 and 6A illustrate a phased array antenna design (59) which incorporates the feeding network and the radiating elements on a single substrate (60) as shown in FIG. 6A. This structure consists of a two-dimensional planar array of coplanar-waveguide patch antennas (61), and an integrated hybrid coplanar waveguide feeding network (62) as shown in FIG. 6. As described in FIG. 6, a $Ba_xSr_{1-x}TiO_3$ thin film (63) is deposited upon each coplanar feed line (62) to control its effective dielectric constant. DC voltages $V_1$(64) and $V_2$(65) provide phase delay control in the x and y directions, respectively. This allows the radiation beam to steer over the entire half-sphere.

Figure 7:
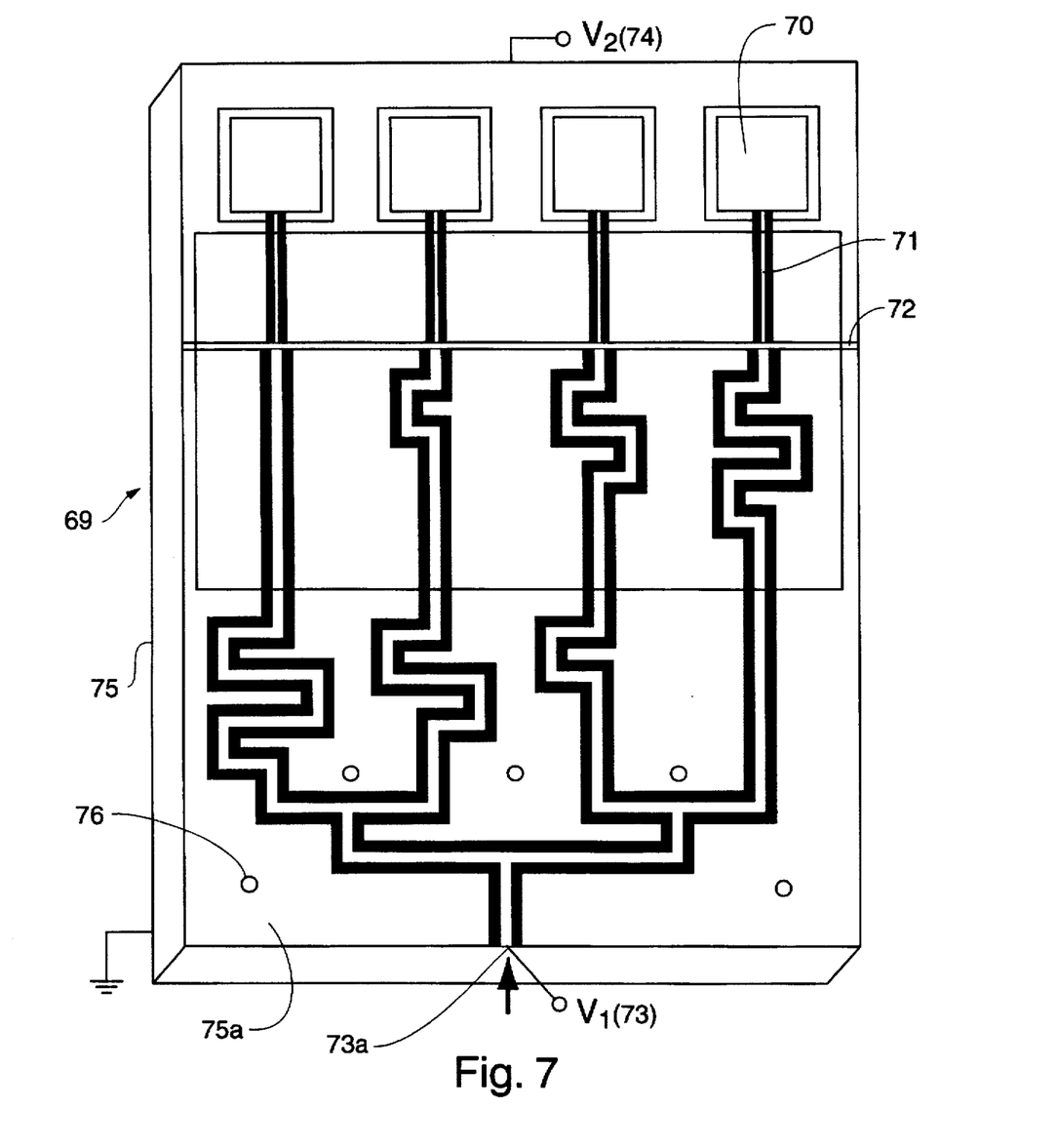
FIG. 7 shows one dimension of a wideband, two-dimensional phased array antenna design incorporating the feed structure shown in FIG. 4, the radiating element shown in FIG. 5, and an impedance-tunable quarter-wave transformer.

FIG. 7 demonstrates one dimension of a wideband, two-dimensional phased array antenna design (69), based on the feed structure (73a) described in FIG. 4, and the coplanar waveguide antennas (70) shown in FIG. 5. The feeding structure (73a) is identical to that of FIG. 4, and will not be described again here. Impedance-tunable quarter-wave transformers (71) illustrated in FIG. 5 are inserted between the radiating elements (70) and the coplanar feed lines (73a) to increase the bandwidth of the antenna (69). By etching gaps (72) on the ground plane of the coplanar lines, the phase delay of the feed line (73a) and the impedance of the transformer can then be tuned separately by the control DC voltages $V_1$(73) and $V_2$(74) , respectively. The ground planes (75a) of the coplanar feed lines are electrically connected to the lower ground plane (75) by several shorting pins (76). Again, for clarity, only a one-dimensional antenna array (69) is shown in FIG. 7; however, the same design concept can be easily extended to the two-dimensional case. Additionally, the bandwidth enhancement technique using the resonant-frequency tunable coplanar-waveguide antenna described in FIG. 5B can also be applied here to improve the bandwidth.

It should be understood that the specific embodiments of this invention shown in the drawings and described herein are for the purpose of example. Other adaptations and modifications may be readily apparent to those skilled in the art. Hence, this invention is limited only by the following claims.

What is claimed is:

1. A phased array antenna system for microwave energy having a steerable main beam for providing half-sphere coverage, the phased array antenna system comprising:

an upper dielectric substrate;

a plurality of microstrip patch antenna elements disposed in a two dimensional phased array in rows and columns on the upper surface of the upper dielectric substrate;

a lower dielectric substrate underlying the upper dielectric substrate;

a common ground plane disposed between the upper and lower dielectric substrates and in contact therewith;

a continuously variable phased delay transmission line including a coplanar waveguide feed line disposed on the lower surface of the lower dielectric substrate;

a nonlinear dielectric thin film overlay disposed on the coplanar waveguide feed line; and at least one of a series-feed and a corporate-feed structure connected to the two dimensional phased array to enable two independent variable DC voltages to control the phase delay between the rows and columns and thereby the phase delay between each element of the two-dimensional phased array coupled to the feed structure, the common ground plane having a plurality of apertures each in alignment with a different one of the plurality of patch antenna elements, each different aperture serving to couple microwave energy from the coplanar waveguide feed line, and through the aperture into each different microstrip patch antenna of the plurality of microstrip patch antennas on the upper dielectric substrate.

2. A single-substrate phased array antenna system having a steerable antenna main beam which provides half-sphere coverage comprising:

a substrate;

a plurality of microstrip patch antenna elements disposed in rows and columns on the substrate to define a two dimensional phased array, the plurality of microstrip patch antennas being arranged into an array;

a continuously variable phased delay transmission line feed structure including a coplanar waveguide having an overlay of a $Ba_xSr_{1-x}TiO_3$ thin film; and a series-feed means connected to the array for enabling two independent variable DC voltages to control the phase delay between rows and columns of the two dimensional phased array and thereby the phase delay between each microstrip patch antenna element of the two dimensional phased array.

3. A wideband phase-scanned coplanar-waveguide antenna array, the antenna array having an impedance and a resonant frequency, at least one of the impedance and the resonant frequency of the antenna array being variable, the antenna array comprising:

a substrate;

a plurality of microstrip patch antenna elements disposed in rows and columns on the substrate thereby defining a two dimensional phase array;

a continuously variable phase delay transmission line including a coplanar waveguide having an overlay of a nonlinear dielectric thin film of $Ba_xSr_{1-x}TiO_3$ material disposed thereon;

a corporate feed means connected to the rows and columns for enabling two independent variable DC voltages to be applied to the nonlinear dielectric thin film to control the phase delay between the rows and columns of the two dimensional phased array and thereby the phase delay between each microstrip patch antenna element of the two dimensional phased array; and a quarter-wave transformer connected between the coplanar waveguide antenna elements and the corporate feed means to provide impedance matching, the impedance matching by the quarter wave transformer increasing the bandwidth of the antenna array.

4. A coplanar waveguide device comprising;

a dielectric substrate, a coplanar waveguide disposed on a surface of the dielectric substrate, the coplanar waveguide having a pair of upper ground planes spaced apart from one another to define an elongated interval extending therebetween, a center conductor disposed in the elongated interval in the plane of and spaced apart from each of the upper ground planes, a lower ground plane disposed on a surface of the dielectric substrate opposite to the surface thereof upon which the coplanar waveguide is disposed; and a nonlinear dielectric thin film disposed on the coplanar waveguide, the dielectric constant of the nonlinear dielectric thin film being a function of a variable DC voltage applied to the nonlinear dielectric thin film, a change in the dielectric constant of the nonlinear dielectric thin film changing the effective dielectric constant of the coplanar waveguide and thereby the phase delay thereof.

* * * * *